(12) United States Patent
Hikima

(10) Patent No.: US 6,384,660 B1
(45) Date of Patent: May 7, 2002

(54) CLOCK CONTROL CIRCUIT AND METHOD

(75) Inventor: Hitoshi Hikima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/688,370

(22) Filed: Oct. 12, 2000

(30) Foreign Application Priority Data

Oct. 13, 1999 (JP) ........................................... 11-291662

(51) Int. Cl.[7] .................................................. H03K 3/00
(52) U.S. Cl. ...................................................... 327/296
(58) Field of Search ................................ 327/172, 176, 327/291–293, 295, 296, 298, 212, 219, 225

(56) References Cited

U.S. PATENT DOCUMENTS

| | | | | |
|---|---|---|---|---|
| 5,281,864 A | * | 1/1994 | Hahn et al. ................. | 327/291 |
| 6,047,382 A | * | 4/2000 | Maley et al. ................ | 713/501 |
| 6,052,811 A | * | 4/2000 | Ahsuri ........................ | 714/745 |
| 6,081,916 A | * | 6/2000 | Whetsel. Jr. ................ | 714/727 |

* cited by examiner

Primary Examiner—My-Trang Nu Ton
(74) Attorney, Agent, or Firm—Whitham, Curtis & Christofferson

(57) ABSTRACT

The clock control circuit of the present invention for controlling a clock supplied to a plurality of flip flops incorporated in a logic circuit, comprises a plurality of clock suppliers, coupled to the respective flip flops. Each of the clock suppliers performs the logical operation with a normal clock and a test clock to allow one of the normal clock and the test clock to pass, using the other clock as a control signal, and supplies the passing clock to the flip flops.

9 Claims, 8 Drawing Sheets

NORMAL MODE SETTING

| TEST TERMINAL | SET VALUE |
|---|---|
| TEST MODE SIGNAL (TEST) | 0 |
| DELAY TEST CLOCK (DCLK) | 0 |
| DATA (RDATA) | -- |

FIG. 4

TEST USING DELAY TEST CLOCK

| TEST TERMINAL | SET VALUE |
|---|---|
| TEST MODE SIGNAL (TEST) | 1 |
| DELAY TEST CLOCK (DCLK) | (CLK) |
| NORMAL CLOCKS (CLK1-CLK3) | 0 |
| DATA (RDATA) | TEST TARGET:1 OTHER THAN TES TARGET:0 |

FIG. 5

TEST USING NORMAL CLOCK

| TEST TERMINAL | SET VALUE |
|---|---|
| TEST MODE SIGNAL (TEST) | 1 |
| DELAY TEST CLOCK (DCLK) | 0 |
| NORMAL CLOCKS (CLK1-CLK3) | (CLK) |
| DATA (RDATA) | TEST TARGET:1 OTHER THAN TEST TARGET:0 |

FIG. 9

NORMAL MODE SETTING

| TEST TERMINAL | SET VALUE |
|---|---|
| TEST MODE SIGNAL (TEST) | 0 |
| DELAY TEST CLOCK (DCLK) | 0 |
| DEGENERACY FAILURE TEST CLOCK (STCLK) | 0 |
| CLOCK TYPE SELECTING SIGNAL (CSEL) | 0 |
| DATA (RDATA) | — — |

FIG. 10

DEGENERACY FAILURE MODE SETTING

| TEST TERMINAL | SET VALUE |
|---|---|
| TEST MODE SIGNAL (TEST) | 0 |
| DELAY TEST CLOCK (DCLK) | 0 |
| DEGENERACY FAILURE TEST CLOCK (STCLK) | (CLK) |
| CLOCK TYPE SELECTING SIGNAL (CSEL) | 0 |
| DATA (RDATA) | — — |

FIG. 11

DELAY TEST MODE SETTING
(USING DELAY TEST CLOCK)

| TEST TERMINAL | SET VALUE |
|---|---|
| TEST MODE SIGNAL (TEST) | 1 |
| DELAY TEST CLOCK (DCLK) | (CLK) |
| DEGENERACY FAILURE TEST CLOCK (STCLK) | — |
| CLOCK TYPE SELECTING SIGNAL (CSEL) | 1 |
| NORMAL CLOCKS (CLK1-CLK3) | 0 |
| DATA (RDATA) | TEST TARGET : 1<br>OTHER THAN TEST TARGET : 0 |

FIG. 12

TEST USING NORMAL CLOCK

| TEST TERMINAL | SET VALUE |
|---|---|
| TEST MODE SIGNAL (TEST) | 1 |
| DELAY TEST CLOCK (DCLK) | 0 |
| DEGENERACY FAILURE TEST CLOCK (STCLK) | — |
| CLOCK TYPE SELECTING SIGNAL (CSEL) | 1 |
| NORMAL CLOCKS (CLK1-CLK3) | (CLK) |
| DATA (RDATA) | TEST TARGET : 1<br>OTHER THAN TEST TARGET : 0 |

CLOCK CONTROL CIRCUIT AND METHOD

BACKGROUND OF THE INVENTION

1. Field of the Invention

The present invention relates to clock control circuit and method for controlling a clock supplied to a flip flop circuit incorporated in a logic circuit, and in particular, to a clock control circuit and method for supplying a test clock to a flip flop circuit instead of a normal clock.

This application is based on Japanese Patent Application No. 11-291662, the contents of which are incorporated herein by reference.

2. Description of the Related Art

In recent years, as the operating speeds of LSIs have increased, means for early detection of a delay failures have becomes important. In general, a high speed test using a high speed tester is executed to detect delay failures. High speed testers, however, are expensive, and increase the costs of the test. As a technique which enables testing using an inexpensive tester, a delay test method using the scan path test function has received attentions.

The delay test using the scan path test function cannot effectively set the path for the test target, e.g., when the target is a degeneracy failure, and cannot produce a test pattern with a high failure detection rate.

To solve the problem, a conventional technique disclosed in Japanese Unexamined Patent Application, First Publication No. Hei 3-61872 (Patent No. 2619957) is known. As shown in FIG, 13, in the conventional technique, a plurality of latches 1, included in a logic circuit which is the test target, are classified into a plurality of groups, and OS latches 2 for controlling the supply/stop of the clock are provided for the respective latch groups.

According to the conventional technique, for example, when testing the signal transfer time of the path from the source latch 1-1 to the target latch 1-2, the OS latches (1) and (3), provided for the group to which the source latch 1-1 and the target latch 1-2 belong, are set to the "effective value", and the other OS latches are set to "invalid value". Thus, the clock is supplied only to the latches in the group to which the source latch 1-1 and the target latch 1-2 belong, and is not supplied to the latches in the other groups.

After the values are thus set in the OS latches, when the clock CLK1 is applied to the source latch 1-1, test data is input to the source latch 1-1 and is output to the path. When applying the clock CLK2 after the data travels through the path and reaches the target latch 1-2, the data is appropriately received by the target latch 1-2. When applying the clock CLK2 before the arrival of the data, the data is not received correctly. That is, the time of the arrival of the data at the target latch 1-2 can be known, based on the point in time of the clock CLK2 when the data to be received by the target latch 1-2 is changed. The signal transfer time can be computed from the difference in time between the clocks CLK1 and CLK2.

According to the technique, even when on the path between the source latch 1-1 and the target latch 1-2 there is a gate circuit 1-30 controlled by a value set in a latch 1-3 in the group containing the OS latch (2), the value in the latch 1-3 is not changed as long as the effective value is set in the OS latch (2). Thus, the destruction of the signal transfer path due to the delay test can be prevented.

In the above-mentioned conventional technique, however, the clock must be externally input into the latches to know the point in time of the clock in the latches. Therefore, the test target is disadvantageously limited to paths between the latches which can receive the external clock. For example, a path between flip flop circuits which are controlled by a clock generated inside an LSI cannot be tested, and thus the flexibility of the logic circuit test is degraded.

BRIEF SUMMARY OF THE INVENTION

It is therefore an object of the present invention to provide a clock control circuit which can supply an appropriate test clock to flip flop circuits such as a latch incorporated in a logic circuit, improving the flexibility of the logic circuit test.

The clock control circuit of the present invention for controlling a clock supplied to a plurality of flip flops (21 to 23 and 31 to 33) incorporated in a logic circuit (paths 101 to 103), comprises a plurality of clock suppliers (11 to 13), coupled to the respective flip flops. Each of the clock suppliers performs the logical operation with a normal clock (CLK1 to CLK3) and a test clock (TCLK1 to TCLK3) to allow one of the normal clock and the test clock to pass, using the other clock as a control signal, and supplies the passing clock to the flip flops.

According to the circuit, the clock supplier functions as a logic gate circuit, such as an OR circuit, or an AND circuit, performs the logical operation with the test clock and the normal clock, and allows one of the normal clock and the test clock to pass, using the other clock as a control signal. For example, when the clock supplier functions as an OR circuit, the normal clock input to the clock supplier is the control signal, and is fixed to 0. Then, the output from the clock supplier is the same value as the test clock so that the clock supplier allows the test clock to pass. Conversely, when the test clock is used as the control signal and is fixed to 0, the clock supplier outputs the same value as the normal clock, and allows the normal clock to pass. Therefore, the normal clock or the test clock, which has passed through the clock supplier, is supplied to the flip flops in the logic circuit.

The clock suppliers allow one of the test clock and the normal clock to pass, using the other clock as the control signal, and supply the passing clock to the flip flops. In other words, the clock suppliers select one of the normal clock and the test clock, and supply the selected clock to the corresponding flip flops. Thus, the test clock can be optionally supplied to the flip flops incorporated in the logic circuit. Thus, the test clock can be optionally supplied to the flip flops incorporated in the logic circuit, and the flexibility of the test for the logic circuit is improved.

Further, the clock control circuit of the present invention, further comprises a clock distributor (40) for distributing the test clock (TCLK1 to TCLK3) to the clock suppliers, depending on data (RDATA) for selecting flip flop circuits.

According to the structure, the test clock is distributed to the clock supplier, depending on the data indicating the selected/unselected flip flops. The clock supplier, which receives the test clock, supplies the test clock to the flip flops. That is, the test clock is supplied only to the flip flops which are selected by the data, and the selected flip flops operate synchronously with the test clock. At that time, the flip flops which are not selected by the data do not operate, and fix their output. Therefore, by setting the data, the test clock is optionally supplied to a plurality of the flip flops, such as latches in the logic circuit, and the clock for those flip flops can be optionally controlled, This prevents the flop flops, which are not the test targets, from operating, and prevents the transmission line of the test target path from being destroyed.

Further, the clock distributor of the present invention comprises: a register (410) for storing the data; and a gate (420) for selectively outputting the test clock to the clock suppliers, depending on the data stored in the register.

According to the structure, the register stores the data indicating the selected/unselected flip flops, and the gate outputs the test clock to the clock suppliers, depending on the data stored in the register. For example, when the data stored in the register does not select any flip flop, the test clock is not output. When the data stored in the register selects the flip flops, the test clock is output. That is, the gate outputs the test clock selectively to the clock supplier, depending on the data stored in the register.

Further, the clock distributor of the present invention further comprises a selector (500) for selecting one of a plurality of prepared signals (DTCLK, or STCLK), and outputting the selected signal as the test clock to the gate.

According to the structure, by selecting the various prepared signal with the selector, the contents of the test clock are changed. Therefore, the test clock, which each of the clock suppliers is to supply to the flip flop, can be changed.

Further, in the present invention, a plurality of prepared signals include at least a clock signal (STCLK) for a degeneracy failure test, and a clock signal (DTCLK) for a delay test.

According to the structure, the test clock, which each of the clock suppliers is to supply to the flip flop, is selected from the clock signal for the degeneracy failure test and the clock signal for the delay test. Thus, as the tests for the logic circuits, both the degeneracy test and the delay test can be executed.

When the data does not select any flip flop, the gate may output the logic value which maintains the outputs from the flip flops. Thus, the outputs from the flip flops which are not selected are not changed, and only the selected flip flops operate.

Further, the clock control method of the present invention for controlling a clock supplied to a plurality of flip flops (21 to 23 and 31 to 33) incorporated in a logic circuit (paths 101 to 103), comprises the step (S10, or S11) of performing the logical operation with a normal clock (CLK1 to CLK3) and a test clock (TCLK1 to TCLK3) to allow one of the normal clock and the test clock to pass, using the other clock as a control signal, and supplying the passing clock to the flip flops.

Further, the clock control method of the present invention for controlling a clock supplied to a plurality of flip flops (21 to 23 and 31 to 33) incorporated in a logic circuit (paths 101 to 103), comprises: a first step (S10) of outputting a test clock (TCLK1 to TCLK3), depending on data (RDATA) for selecting flip flop circuits; and a second step (S11) of performing the logical operation with a normal clock (CLK1 to CLK3) and the test clock to allow one of the normal clock and the test clock to pass, using the other clock as a control signal, and supplying the passing clock to the flip flops.

The first step includes performing the logical operation with the data and the test clock to selectively output the test clock, depending on the data (the function of the clock distributing circuit 40).

The first step includes selecting one of a plurality of prepared signals (DTCLK and STCLK), and outputting the selected signal as the test clock (the function of the selecting circuit 500).

BRIEF DESCRIPTION OF THE DRAWINGS

FIG. 4 is a diagram showing the setting values at the test terminals in a delay test mode (using the test clock) of the semiconductor circuit of the first embodiment of the present invention.

FIG. 5 is a diagram showing the setting values at the test terminals in a delay test mode (using the normal clock) of the semiconductor circuit of the first embodiment of the present invention.

FIG. 9 is a diagram showing the setting values at the test terminals in the normal mode of the semiconductor circuit of the second embodiment of the present invention.

FIG. 10 is a diagram showing the setting values at the test terminals in the degeneracy failure mode of the semiconductor circuit of the second embodiment of the present invention.

FIG. 11 is a diagram showing the setting values at the test terminals in the delay test mode (using the test clock) of the semiconductor circuit of the second embodiment of the present invention.

FIG. 12 is a diagram showing the setting values at the test terminals in the delay test mode (using the normal clock) of the semiconductor circuit of the second embodiment of the present invention.

DETAILED DESCRIPTION OF THE INVENTION

The embodiment of the present invention will be explained with reference to the figures.

First Embodiment

Figure 1:
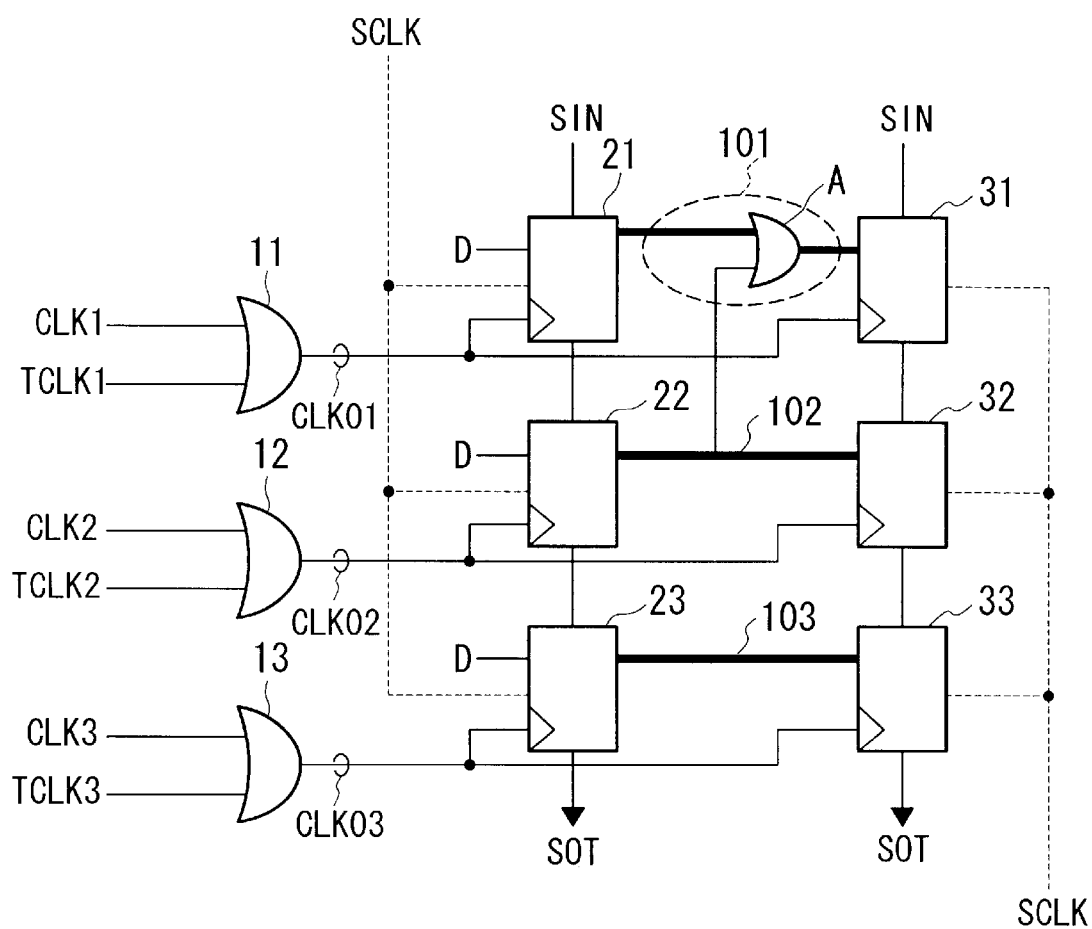
FIG. 1 is a circuit diagram showing the semiconductor circuit with the clock control circuit of the first embodiment of the present invention.

FIG. 1 shows the construction of a semiconductor circuit to which the clock control circuit of the first embodiment is applied. The semiconductor circuit can execute a delay test using the scan path method, and has a plurality of flip flop circuits 21 to 23 and 31 to 33 for executing the scanning, which form signal transfer paths 101 to 103 and are incorporated in a logic circuit (no reference numeral). The flip flop circuits are provided at both the ends of the respective paths.

An OR circuit "A" (logic sum circuit) is provided on the path 101. One input terminal of the OR circuit is connected to a signal line output from the flip flop circuit 21, and the other input terminal is connected to a signal line output from the flip flop circuit 22 provided at the starting point of the path 102. Thus, changes in signals through the path 102 affect the path 101.

In the test using the scan path, the flip flop circuits for providing the scanning function receive input data settings required for the test and data output from the logic circuit which is the test target. The flip flop circuits 21 to 23 and 31 to 33 receive data when the logic value of the clock is 0, and store the data when the logic value is 1.

While in the embodiment the targets of the delay test are the paths 101 to 103, the present invention is not limited to this, and the path may be appropriately set, depending on the contents of the test.

Figures 2, 3:
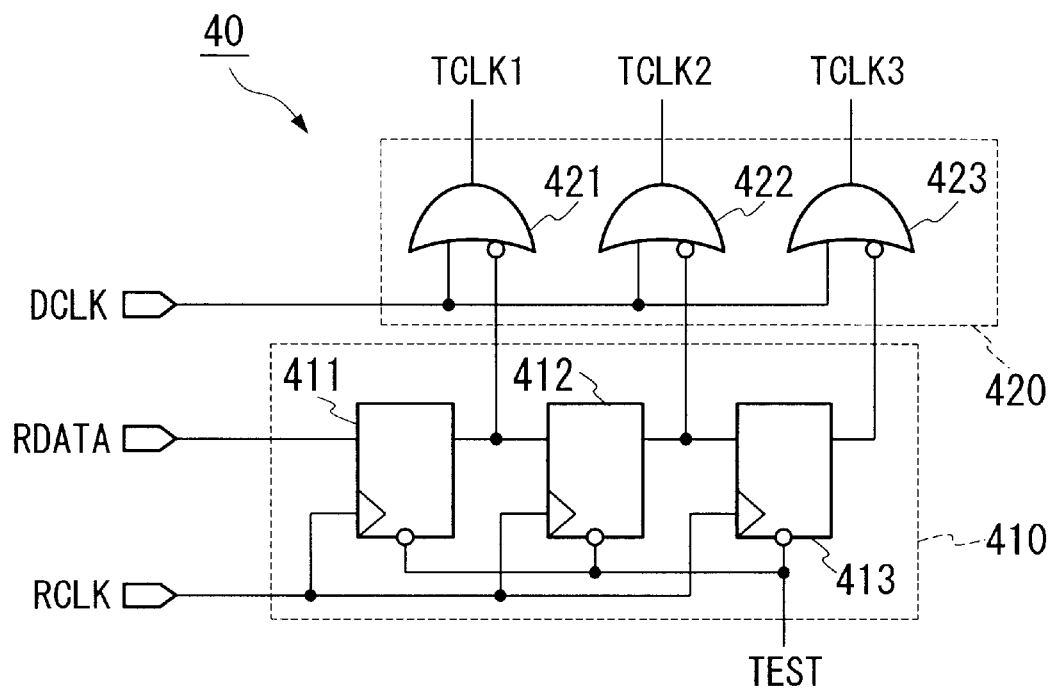
FIG. 2 is a circuit diagram showing the clock distributing circuit of the first embodiment of the present invention.
FIG. 3 is a diagram showing the setting values at the test terminals in a normal mode of the semiconductor circuit of the first embodiment of the present invention.

Further, the semiconductor circuit has a clock control circuit (no reference numeral) of the present invention for controlling the clocks CLK01 to CLK03 supplied to the flip flop circuits 21 to 23 and 31 to 33. The clock control circuit comprises a plurality of clock supply circuits 11 to 13 which are shown in FIG. 1 and which correspond to the respective the flip flop circuits 21 to 23 and 31 to 33, and a clock distributing circuit 40, which is shown in FIG. 2, for distributing a test clock to the clock supply circuits 11 to 13.

The clock supply circuits 11 to 13 are specifically OR gate circuits which perform the logic operation with the normal clocks and the test clocks to allow one of the normal clocks CLK1 to CLK3 and the test clocks TCLK1 to TCLK3 to pass, using the others as control signals.

The clock distributing circuit 40 distributes a prepared test clock DCLK as the test clocks TCLK1 to TCLK3 to the clock supply circuits 11 to 13, depending on data RDATA indicating whether the respective flip flop circuits 21 to 23 and 31 to 33 are selected.

Specifically, the clock distributing circuit 40 comprises a register circuit 410 comprising flip flops 411 to 413 for storing the data RDATA, and a gate circuit 420 for outputting the test clock DCLK to the clock supply circuits 11 to 13, depending on the data RDATA stored in the register circuit 410. The gate circuit 420 comprises OR circuits 421 to 423 for performing OR operations with the data RDATA and the test clock DCLK.

The flip flops 411 to 413 constitute a shift register in which the flip flop 411 is the first stage. The data RDATA is input to a data terminal of the flip flop 411, and is shifted in sequence toward the lower side synchronously with a clock RCLK for the register. A test mode signal TEST is input to set the terminals of the flip flops 411 to 413.

The gate circuit 420 performs the logic operations with the data RDATA and the test clock DCLK to produce the test clocks TCLK1 to TCLK3 so that the test clocks TCLK1 to TCLK3 have the same value as the test clock DCLK or a predetermined logic value, depending on the data RDATA, and supplies the test clocks TCLK1 to TCLK3 to the clock supply circuits 11 to 13. Specifically, the OR circuits 421 to 423 constituting the gate circuit 420 receive as input (positive logic value) the test clock DCLK, receive as another input (negative logic value) the output signals from the flip flops 411 to 413, and output the test clocks TCLK1 to TCLK3.

The above-described test mode signal TEST, the test clock DCLK, and the data RDATA are input to specified terminals (hereinafter referred to as test terminals) which are used only for the test.

The normal clocks CLK1 to CLK3 may be signals input from normal external terminals, or may be produced within the semiconductor circuit. In the first embodiment, the normal clocks CLK1 to CLK3 are produced within the semiconductor circuit, and are not directly controlled by an external device.

Next, the operations in the clock control circuit of the present invention in respective modes will be explained.

(A) Normal Mode

FIG. 3 shows setting values for the respective test terminals in the normal mode for normally operating the semiconductor circuit. As shown in this figure, to set the normal mode in the semiconductor circuit, the test mode signal TEST is set to 0 (logic value), and the test clock DCLK is set to 0. When the test mode signal TEST is set to 0, all the flip flops 411 to 413 are set to 1. Thus, the data RDATA at the test terminals can be optionally set.

When the signals at the test terminals are thus set, all the test clocks TCLK1 to TCLK3, which are output from the clock distributing circuit 40 shown in FIG. 2, are fixed to 0. The clock supply circuits 11 to 13 of FIG. 1, which receive those clocks, output the normal clocks CLK1 to CLK3 as clocks CLK01 to CLK03 to the respective flip flop circuits. That is, the clock supply circuits 11 to 13 output the normal clocks CLK1 to CLK3 to the flip flop circuits, depending on the clocks CLK01 to CLK03 which serve as the control signals. The flip flop circuits 21 to 23 and 31 to 33 receive the normal clocks, and can operate normally.

(B) Delay Test Mode

There are two clock control methods for performing delay tests: a control method using the test clocks TCLK1 to TCLK3 (DCLK), and a control method using the normal clocks CLK1 to CLK3. Below is the description of the delay tests using these clock control methods for the path 101, shown in FIG. 1, as the test target.

Referring to the flowchart of FIG. 6, the procedure of the delay test using the clock control with the test clock will be explained.

In step S1, the test terminals are set to initial values (initialization). Specifically, as shown in FIG. 4, the test mode signal TEST is set to 1, the test clock DCLK is externally set to a prepared clock (CLK), and the normal clock CLK1 is set to 0.

Only the normal clock corresponding to the path 101 which is the test target must be set to 0. Further, the normal clocks corresponding to the path other than the test target may be set to 0.

The data RDATA is set in the flip flops in the register circuit 410 so that the flip flop circuits 21 and 31 connected to the test target path 101 are selected and so that the flip flop circuits 22, 23, 32, and 33 of the paths 102 and 103 other than the test target are not selected. In the first embodiment, the flip flop 411 is set to 1, and the other flip flops 412 and 413 are set to 0.

When the respective test terminals are thus set, the clock supply circuit 11, which receives 0 as the normal clock CLK1, outputs the test clock TCLK1 as the clock CLK01, and the test clock TCLK1 enables the clock control.

Figure 7:
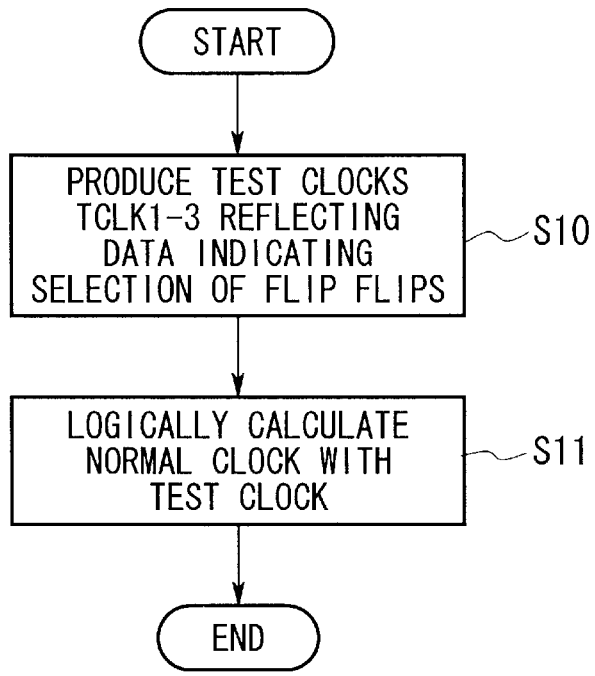
FIG. 7 is a flowchart showing the flow of the operation of the clock control circuit of the first embodiment of the present invention.

Referring to the flowchart of FIG. 7, the clock control method using the test clock will be explained.

In step S10, the clock distributing circuit 40 outputs the test clocks TCLK1 to TCLK3, which reflect the data RDATA indicating the selected/unselected flip flop circuits 21 to 23 and 31 to 33 connected to the respective paths, to the clock supply circuits 11 to 13.

Specifically, in the clock distributing circuit 40 shown in FIG. 2, the logic value of 1 stored as the data RDATA in the flip flop 411 is supplied to the OR circuit 421, and is then logically summed with test clock DCLK, and the test clock TCLK1 is output from the OR circuit 421. In other words, the test clock DCLK passes through the OR circuit 421 of the clock distributing circuit 40, and is distributed as the test clock TCLK1 to the clock circuit 11.

The logic value of 0, which has been stored as the data RDATA in the flip flops 412 and 413, is supplied to the OR circuits 422 and 423, and is logically summed with the test clock DCLK. As a result, the test clocks TCLK2 and TCLK3, which are output from the OR circuits 422 and 423, are set to 1. That is, the test clocks TCLK2 and TCLK3 are set so that the flip flop circuits 22, 23, 32, and 33 maintain their data.

In step S11, the normal clocks and the test clocks are logically summed, so as to use one of the normal clocks CLK1 to CLK3 and the test clocks TCLK1 to TCLK3 as the control signals and to allow the others to pass, and the results are supplied to the flip flops. Specifically, the clock supply circuits 11 to 13 perform the OR operation with the test clocks TCLK1 to TCLK3, which are output from the clock distributing circuits 421 to 423, with the normal clocks CLK1 to CLK3, and output the results of the logic operations as the clock CLK01 to CLK03.

Because as described above the test clocks TCLK2 and TCLK3 are set to 1, the clocks CLK02 and CLK03 are fixed to 0. Accordingly, the flip flop circuits 22, 23, 32, and 33, which have received the clocks CLK02 and CLK03, are not selected, and maintain their output data. This eliminates unnecessary operations of the paths (102, and 103) which are not the test target. Even if the operation of the path 102 may adversely affect the test target path 101, the signal transfer path of the test target path 101 is prevented from being destroyed.

Because the normal clock CLK1 is set to 1, the clock CLK01 output from the clock supply circuit 11 is the same value as the test clock TCLK1. That is, the clock supply circuit 11 uses the normal clock CLK1 as the control signal, and allows the test clock TCLK1 to pass. The test clock TCLK1 is supplied as the clock CLK01 to the flip flop circuits 21 and 31. Thus, the clock control supplies the test clock TCLK1 to the flip flop circuits 21 and 31 connected to the test target path 101, that is, selects the flip flop circuits 21 and 31.

Thus, the test clock DCLK controls the test clock TCLK1, and optionally controls the clock in the flip flop circuits connected to the test target path 101. That is, the clock can be controlled by the test clock TCLK1.

While the embodiment controls the clock using the test clock TCLK1, the test clocks TCLK1 to TCLK3 may be selectively supplied by resetting the data RDATA stored in the register circuit 410. In the latter case, a combination of the test clocks can be supplied.

Figure 6:
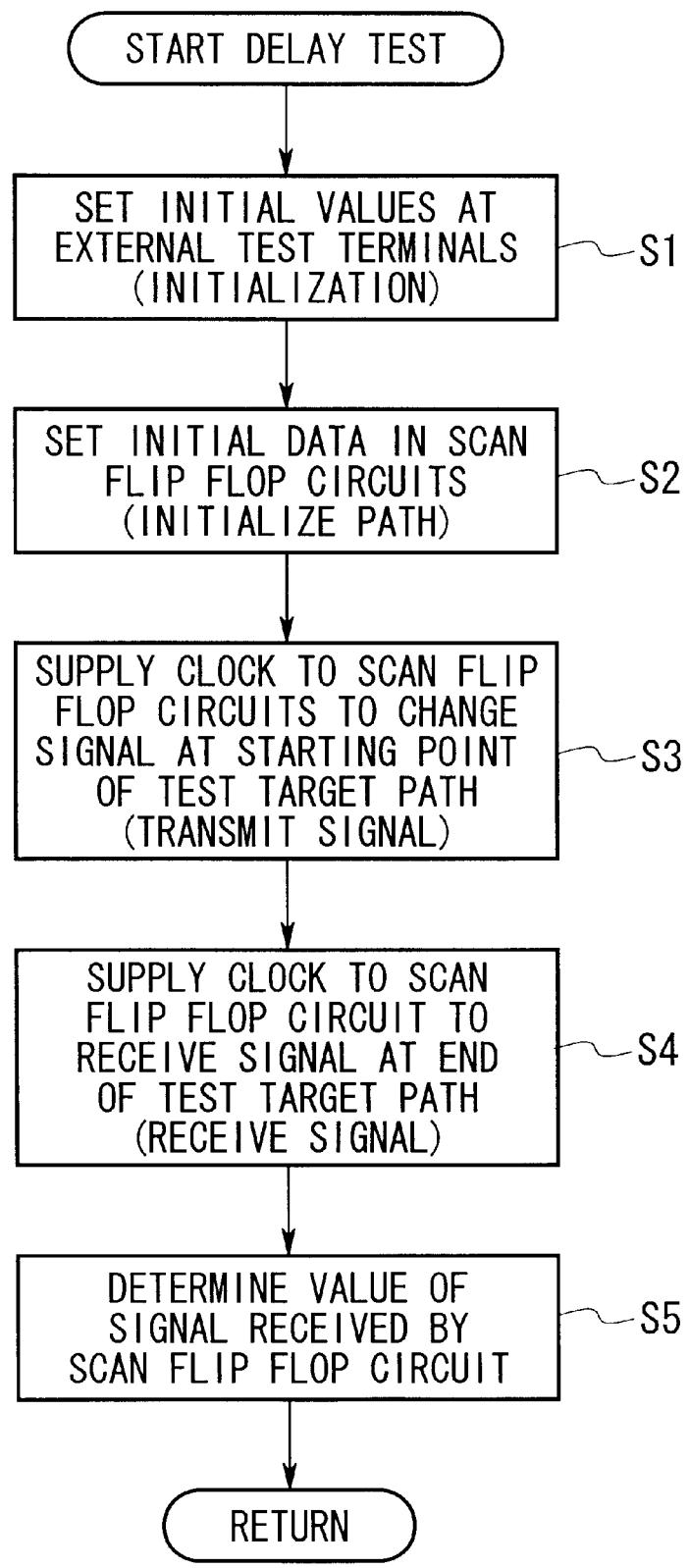
FIG. 6 is a flowchart showing the procedure of the delay test for the semiconductor circuit of the first embodiment of the present invention.

The description returns to the flowchart of FIG. 6.

In step S2, when in step S1 the test terminals are initialized so that the clock control only by the test clock TCLK1 is enabled, initial data are set in the flip flop circuits connected to the paths, and the paths are thus initialized.

Specifically, when executing the test by changing the signal in the path from 0 to 1, 0 is set as the initial data in the flip flop circuit 21 connected to the starting point of the path 101 which is the test target. Conversely, when executing the test by changing the signal from 1 to 0, 1 is set as the initial data in the flip flop circuit 21. The embodiment tests the path 101 by the change of the signal from 0 to 1.

When the signal at the starting point of the test target path 101 is changed, all the signals in the paths which affect the path 101 are fixed so that the change in the signal is transmitted to the end of the path. Specifically, 0 is set as the initial data in the flip flop circuit 22 connected via the path 102 to the input terminal of the OR circuit A in the path 101, and the signal in the path 102 supplied to the OR circuit A is set to 0.

The initial data are supplied by shifting scan input data SIN in sequence through the flip flop circuits 21 to 23 and 31 to 33 synchronously with a scan clock SCLK supplied to the semiconductor circuit. In this embodiment, 0 is stored as the initial data in the flip flop circuit 21 connected to the starting point of the test target path 101 and in the flip flop circuit 22 which affects the signal transmission through the test target path 101, so that only the path 101 is initialized. At the same time as the initialization, the data D of the logic value of 1, which is the inverse of the initial data set in the flip flop circuit 21, is input to the data input terminal of the flip flop circuit 21 connected to the starting point of the test target path 101.

In step S3, subsequently, the test clock TCLK1 is supplied as the clock CLK01 to the flip flop circuit 21 so that the signal at the starting point of the test target path 101 is changed. Specifically, according to the pulse of the test clock TCLK1, the flip flop circuit 21 stores the data D of the logic value of 1. As a result, the flip flop circuit 21 outputs the data signal having the logic value of 1. Then, the signal at the starting point of the path 101, which has been initialized to 0, is changed to 1, and this data signal is transmitted through the path 101. At that time, because the flip flop circuit 22 connected to the path 102 which is not the test target maintains its output data, the OR circuit A which is affected by the signal in the path 102 does not destroy the signal transmission in the path 101.

Then, the flip flop circuit 31, which receives as input the same clock as that input to the flip flop circuit 21, receives the data signal which appears at the end of the path 101. At that point in time, the data signal having the logic value of 1, which the flip flop circuit 21 output to the starting point of the path 101, has not reached the end. Therefore, the flip flop circuit 31 receives 0 which is the same value as the initial data, that is, the stored value is not changed.

In step S4, after a specified time has passed since the flip flop circuit 21 has received the data D having the logic value of 1, the flip flop circuit 31 again receives the data signal at the end of the path 101 synchronously with the pulse of the test clock TCLK1. At that time, the flip flop circuit 21, connected to the starting point of the path 101, again receives the data D. Even when this data D at the starting point is changed, the change in the data does not reach the end of the path 101, and does not affect the data to be received by the flip flop circuit 31.

In that process, after the specified time has passed since the first pulse of the test clock TCLK1 has been produced, the next pulse is produced. The specified time is a standard value which ensures the required signal transmission time in the test target path 101.

In step S5, the logic value received by the flip flop circuit 31 is determined. Specifically, synchronously with the scan clock SCLK, the values received by the flip flop circuit 31 are shifted in sequence to a scan output terminal SOT, and the logic value output at the output terminal SOT is checked. When the second pulse of the test clock TCLK1 is supplied to the flip flop circuit 31, and when the data D output from the flip flop circuit 21 does not reach the end of the path 101, the logic value of the initial data of 0 at the end is received by the flip flop circuit 31, and therefore the value in the flip flop circuit 31 is not changed. Accordingly, the value in the flip flop circuit 31 is determined as 0. When the data D reaches the end of the path 101, the logic value of the data D of 1 is received by the flip flop circuit 31, and the value in the flip flop circuit 31 is changed to 1. Accordingly, the value in the flip flop circuit 31 is determined as 1.

As described above, since the specified time has passed after the first pulse of the test clock TCLK1 was supplied to the flip flop circuits 21 and 31, the pulse of the test clock TCLK1 is supplied again, and the value stored in the flip flop circuit 31 at the end is determined. A delay failure (a failure in which a signal is not transmitted within a specified time) is detected in the path 101. Thus, the delay test is executed. Further, while the specified time is gradually increased, the value stored in the flip flop circuit may be determined. In this case, the delay time of the path 101 can be known from the point in time at which the determined value is changed from 0 to 1.

Next, the procedure of the delay test under the clock control using the normal clock CLK1 will be explained with reference to FIG. 6. The normal clock CLK1 is controllable directly from the external terminal.

When referring to FIG. 6, steps S1 to S5 are read as S21 to S25.

In step S21, the test terminals are set to initial values. Specifically, as shown in FIG. 5, the test mode signal TEST is set to 1, and the test clock DCLK is set to 0. The normal clocks CLK1 to CLK3 are set to a clock (CLK) produced based on the contents of the test.

The data RDATA is set in the flip flops in the register circuit 410 so that the flip flop circuit, which is the test target, is selected and so that the flip flop circuits other than the test target are not selected. In the first embodiment, in a manner similar to the case performing the clock control using the test clock, the flip flop 411 is set to 1, and the other flip flops 412 and 413 are set to 0, so that the path 101 shown in FIG. 1 is the test target of the delay test.

By setting the respective test terminals to the above-described values, in the clock distributing circuit 40 shown in FIG. 2, the test clock TCLK1 output from the OR circuit 421 is fixed to 0, and the test clocks TCLK2 and TCLK3 output from the OR circuits 422 and 423 are fixed to 1. Therefore, the clock supply circuit 11 outputs the normal clock CLK1 as the clock CLK01, and the clocks CLK02 and CLK03 output from the clock supply circuits 12 and 13 are fixed to 1.

Thus, the normal clock CLK1 is supplied as the clock CLK01 to the flip flop circuits 21 and 31, and enables the clock control by the normal clock CLK1. In this case, the flip flop circuits 21 and 31, which receive the clock CLK01, are selected, and the flip flop circuits 22, 23, 32, and 33, which receive the clocks CLK02 and CLK03, are not selected.

In step S22, after the test terminals were initialized in step S21 so that the clock control by the normal clock CLK1 has been enabled, the clock control by the test clock is performed, and the initial data are set in the flip flop circuits connected to the paths so that the paths are initialized. That is, the flip flop circuit 21 connected to the starting point of the test target path 101 and the flip flop circuit connected to the starting point of the path 102 which may affect the signal transmission through the test target path 101 store 0 as the initial data.

In step S23, the normal clock CLK1 is supplied as the clock CLK01 to the flip flop circuit 21 so that the signal at the starting point of the test target path 101 is changed. Specifically, according to the pulse of the normal clock CLK1, the flip flop circuit 21 stores the data D having the logic value of 1. As a result, the flip flop circuit 21 outputs the data signal having the logic value of 1. Then, the signal at the starting point of the path 101, which has been initialized to 0, is changed to 1, and this data signal is transmitted through the path 101.

In step S24, after a specified time has passed since the flip flop circuit 21 has received the data D, the flip flop circuit 31 again receives the data signal at the end of the path 101 synchronously with the pulse of the normal clock CLK1.

In step S25, the logic value received by the flip flop circuit 31 is determined. When the second pulse of the normal clock CLK1 is supplied to the flip flop circuit 31, and when the data D output from the flip flop circuit 21 does not reach the end of the path 101, the value set in the flip flop circuit 31 is determined as 0. When the data D reaches the end of the path 101, the value in the flip flop circuit 31 is determined as 1.

As described above, since the specified time has passed after the first pulse of the normal clock CLK1 was supplied to the flip flop circuit 21 and 31, the pulse of the normal clock CLK1 is supplied again, and the value stored in the flip flop circuit 31 at the end is determined. Thus, the delay of the path 101 can be known in a manner similar to the clock control using the test clock.

According to the clock control circuit of the first embodiment of the present invention, the clock control can be achieved for the flip flop circuits incorporated in the logic circuit.

Second Embodiment

Next, the second embodiment of the present invention will be explained.

Figure 8:
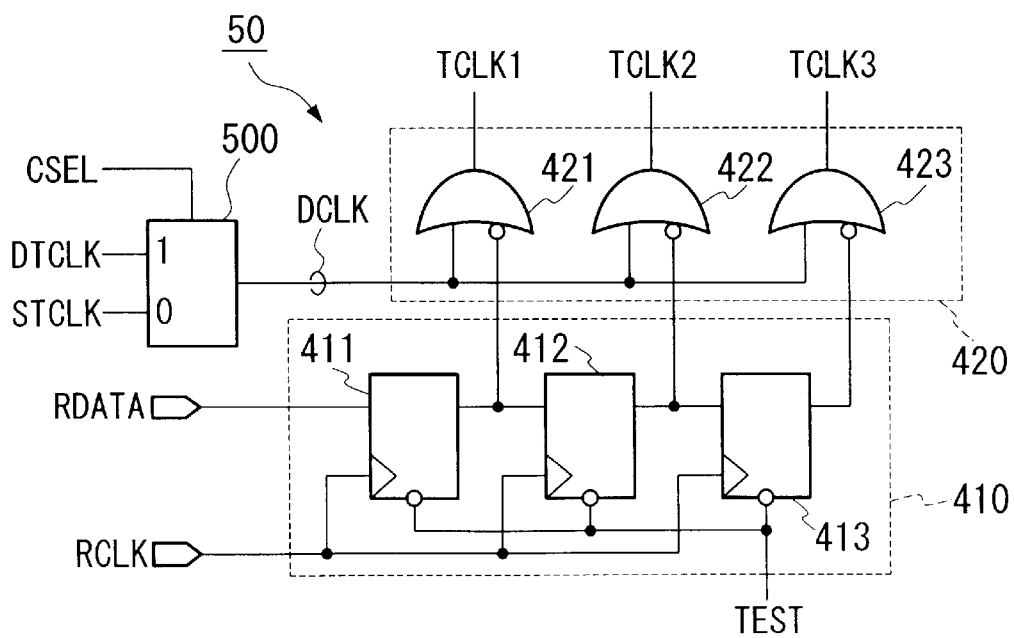
FIG. 8 is a circuit diagram showing the clock distributing circuit in the second embodiment of the present invention.
Figure 13:
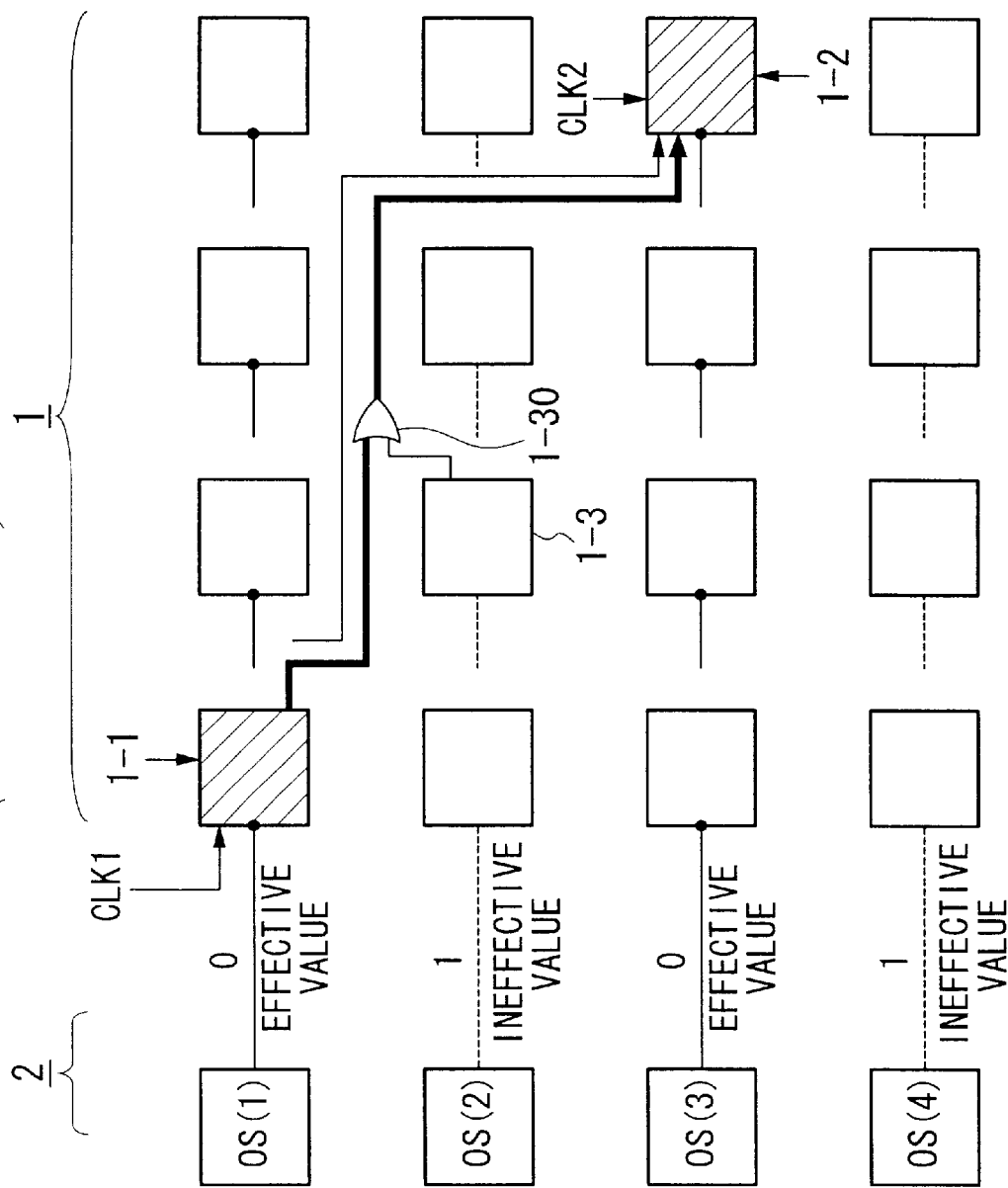
FIG. 13 is a diagram explaining the conventional technique.

The clock control circuit of the second embodiment has a clock distributing circuit 50 shown in FIG. 8, instead of the clock distributing circuit 40 in the structure of the first embodiment shown in FIGS. 1 and 2.

In the following description, the parts in FIG. 1 are appropriately referred to.

The clock distributing circuit 50 has, in addition to the gate circuit 420 and the register circuit 410 in the clock distributing circuit 40 shown in FIG. 2, a clock selecting circuit 500. The clock selecting circuit 500 selects one of a plurality of prepared signals, and outputs it as the test clock DCLK to the gate circuit 420.

In the second embodiment, the clock selecting circuit 500 receives as inputs a clock DTCLK (delay test clock) for performing a delay test and a clock STCLK (degeneracy failure clock) for performing a degeneracy failure test, selects one of the clocks, depending on a clock type selecting signal CSEL, and outputs it as the test clock DCLK to the gate circuit 420. The clock type selecting signal CSEL, and the clocks DTCLK and STCLK to be supplied to the clock selecting circuit 500 are provided at the test terminals in a fashion similar to the other signals.

The operations of the clock control circuit of the second embodiment in the respective modes will be explained.
(A) Normal Mode FIG. 9 shows the setting values at the test terminals in the normal mode in which the semiconductor circuit normally operates. As shown in this figure, to set the semiconductor circuit in the normal mode, a test mode signal TEST is set to 0, the delay test clock DTCLK is set to 0, the degeneracy failure clock STCLK is set to 0, and the clock type selecting signal CSEL is set to 0. When the test mode signal TEST is set to 0, all the flip flops 411 to 413 are set to 1. Therefore, the data RDATA at the test terminals can be optionally set.

When the signals at the test terminals are thus set, all the test clocks TCLK1 to TCLK3, which are output from the clock distributing circuit 50 shown in FIG. 8, are fixed to 0. The clock supply circuits 11 to 13 of FIG. 1, which receive those clocks, output the normal clocks CLK1 to CLK3 as clocks CLK01 to CLK03 to the respective flip flop circuits. The flip flop circuits 21 to 23 and 31 to 33 receive the normal clocks, and operate normally.

(B) Degeneracy Failure Mode

A degeneracy failure fixes a node in the circuit to 0 or 1. Therefore, the entire circuit must be tested (that is, the test target path for the delay test need not be specified).

The features of the procedure of the degeneracy failure test under the control of the degeneracy failure clock STCLK will be explained.

As shown in FIG. 10, initial values are set at the test terminals. Specifically, the test mode signal TEST is set to 0, the degeneracy failure clock STCLK is set to a prepared clock CLK, and the clock type selecting signal CSEL is set to 0. By setting the test mode signal TEST to 0, all the flip flops 411 to 413 are set to 1. Therefore, the data RDATA at the test terminals can be optionally set.

When the initial values are thus set at the test terminals, the degeneracy failure clock STCLK is supplied as clocks CLK01 to CLK03 to all the flip flop circuits 21 to 23 and 31 to 33. Thus, the test for the degeneracy failure is possible.

(C) Delay Test Mode

As the clock control method for performing the delay test, there is a control method using the delay test clock DTCLK, and a control method using the normal clocks CLK1 to CLK3.

These control methods are similar to the first embodiment, except that the delay test clock DTCLK selected by the clock selecting circuit 500 is used as the test clock DCLK in the first embodiment.

FIGS. 11 and 12 show the setting values of the signals at the test terminals of the second embodiment.

As shown in FIG. 11, when performing the delay test under the control of the delay test clock DTCLK, the test mode signal TEST is set to 1, the delay test clock DTCLK is set to a prepared clock CLK, the degeneracy failure clock STCLK is optional, the clock type selecting signal CSEL is set to 1, and the normal clocks CLK1 to CLK3 are set to 0. Further, the data RDATA to be stored in the flip flops in the register circuit 410 are set so that the flip flop circuit connected to the test target path is selected, and the flip flop circuits connected to the paths other than the test target are not selected.

As shown in FIG. 12, when performing the delay test under the control of the normal clock, the test mode signal TEST is set to 1, the delay test clock DTCLK is set to 0, the degeneracy failure clock is optional, the clock type selecting signal CSEL is set to 1, and the normal clocks CLK1 to CLK3 are set to clocks depending on the contents of the test. Further, the data RDATA to be stored in the flip flops in the register circuit 410 are set so that the flip flop circuit connected to the test target path is selected, and the flip flop circuits connected to the paths other than the test target are not selected.

In FIGS. 11 and 12, one of the delay test clock DTCLK and the normal clock CLK1, CLK2, or CLK3 is used for the clock control, the other is set to 0. The selection of the delay test clock or the normal clock for the clock control depends on which clock is set to 0. Therefore, a signal for selecting the clock can be eliminated.

When both the degeneracy failure clock and the delay test clock are externally provided, the two clocks may be provided as a single common clock, and the clock selecting circuit 500 can be eliminated. However, when the degeneracy failure clock is internally produced, these clocks cannot be provided as a single clock, and the clock selecting circuit 500 is effective.

While the first and second embodiments are explained, this invention may be embodied in other forms or carried out in other ways without departing from the spirit thereof.

For example, although the clock supply circuits 11 to 13 are the OR circuits, the present invention is not limited to this, and AND circuits may be employed.

While in the above embodiment the clock supply circuits 11 to 13 are two-input type OR circuits. The present invention is not limited to this, and three-input type circuits may be employed. According to this structure, the number of test clock types can be increased so that various tests can be performed.

While in the embodiments the clock supply circuits 11 to 13 set one of the normal clock and the test clock to 0 and selectively outputs the other clock, the normal clock may be supplied as the first clock to the flip flop circuit 21, and the test clock may be supplied as the second clock to the flip flop circuit 31, that is, both the clocks may be used.

While the clock selecting circuit 500 selects and outputs one of the delay test clock DTCLK and the degeneracy failure clock STCLK, depending on the clock type selecting signal CSEL, the clock selecting circuit 500 may be constituted from logic circuits like the clock supply circuit 11.

As described above, the clock control circuit of the present invention for controlling a clock supplied to a plurality of flip flops incorporated in a logic circuit, comprises a plurality of clock suppliers, coupled to the respective flip flops. Each of the clock suppliers performs the logical operation with a normal clock and a test clock to allow one of the normal clock and the test clock to pass, using the other clock as a control signal, and supplies the passing clock to the flip flops. Thus, the test clock can be optionally supplied to the flip flops incorporated in the logic circuit, and the flexibility of the test for the logic circuit is improved.

Further, the clock control circuit of the present invention, further comprises a clock distributor for distributing the test clock to the clock suppliers, depending on data for selecting flip flop circuits. Therefore, the flip flops can be selectively operated.

Further, the clock distributing circuit of the present invention comprises: a register for storing the data; and a gate for selectively outputting the test clock to the clock suppliers, depending on the data stored in the register. Therefore, the test clock is output, depending on the data indicating the selected/unselected flip flops.

Further, the clock distributor of the present invention further comprises a selector for selecting one of a plurality of prepared signals, and outputting the selected signal as the test clock to the gate. The contents of the test clock are changed, depending on the type of the test.

Further, in the present invention, the prepared signals include at least a clock signal for a degeneracy failure test, and a clock signal for a delay test. The test clock is selected from the clock signal for the degeneracy failure test and the clock signal for the delay test, and is supplied.

Further, the clock control method of the present invention for controlling a clock supplied to a plurality of flip flops incorporated in a logic circuit, comprises the step of performing the logical operation with a normal clock and a test clock to allow one of the normal clock and the test clock to pass, using the other clock as a control signal, and supplying the passing clock to the flip flops. While selectively operating the flip flops, the test clock can be optionally supplied to the flip flops incorporated in the logic circuit, and the flexibility of the test for the logic circuit is improved.

Further, the clock control method of the present invention for controlling a clock supplied to a plurality of flip flops incorporated in a logic circuit comprises: a first step of outputting a test clock, depending on data for selecting flip flop circuits; and a second step of performing the logical operation with a normal clock and the test clock to allow one of the normal clock and the test clock to pass, using the other clock as a control signal, and supplying the passing clock to the flip flops. While selectively operating the flip flops, the test clock can be optionally supplied to the flip flops incorporated in the logic circuit, and the flexibility of the test for the logic circuit is improved.

The first step includes performing the logical operation with the data and the test clock to selectively output the test clock, depending on the data. Therefore, the test clock is output, depending on the data indicating the selected/unselected flop flops.

The first step includes selecting one of a plurality of prepared signals, and outputting the selected signal as the test clock. The contents of the test clock are changed, depending on the type of the test.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A clock control circuit for controlling a clock supplied to a plurality of flip flops incorporated in a logic circuit, comprising:

a plurality of clock suppliers, coupled to the respective flip flop circuits, each of which performs a logical operation with a normal clock and a test clock to allow one of the normal clock and the test clock to pass, using the other clock as a control signal, and supplies the passing clock to each of the flip flops.

2. A clock control circuit according to claim 1, further comprising a clock distributor for distributing the test clock to the clock suppliers, depending on data for selecting flip flop circuits.

3. A clock control circuit for controlling a clock supplied to a plurality of flip flops incorporated in a logic circuit, comprising:

a plurality of clock suppliers, coupled to the respective flip flop circuits, each of which performs a logical operation with a normal clock and a test clock to allow one of the normal clock and the test clock to pass, using the other clock as a control signal, and supplies the passing clock to each of the flip flops; and a clock distributor for distributing the test clock to the clock suppliers, depending on data for selecting flip flop circuits, wherein the clock distributor comprises:

register for storing the data; and a gate for selectively outputting the test clock to the clock suppliers, depending on the data stored in the register.

4. A clock control circuit according to claim 3, wherein the gate comprises a selector for selecting one of a plurality of prepared signals, and outputting the selected signal as the test clock to the gate.

5. A clock control circuit according to claim 4, wherein the prepared signals include at least a clock signal for a degeneracy failure test, and a clock signal for a delay test.

6. A clock control method for controlling a clock supplied to a plurality of flip flops incorporated in a logic circuit, comprising the steps of:

performing a logical operation with a normal clock and a test clock to allow one of the normal clock and the test clock to pass;

using the other of said normal clock and said test clock as a control signal; and supplying the passing clock to the flip flops.

7. A clock control method for controlling a clock supplied to a plurality of flip flops incorporated in a logic circuit, comprising:

a first step of outputting a test clock, depending on data for selecting flip flop circuits; and a second step of performing a logical operation with a normal clock and the test clock to allow one of the normal clock and the test clock to pass;

using the other of said normal clock and said test clock as a control signal; and supplying the passing clock to the flip flops.

8. A clock control method according to claim 7, wherein the first step includes performing the logical operation with the data and the test clock to selectively output the test clock, depending on the data.

9. A clock control method according to claim 8, wherein the first step includes selecting one of a plurality of prepared signals as the test clock.

* * * * *